United States Patent [19]

Mukoyama et al.

[11] 4,323,664

[45] Apr. 6, 1982

[54] PROCESS FOR PRODUCING GRANULAR POLYMER HAVING UNIFORM FINE PARTICLE SIZE

[75] Inventors: Yoshiyuki Mukoyama; Nobutoshi Chikazumi, both of Hitachi, Japan

[73] Assignee: Hitachi Chemical Company, Ltd., Tokyo, Japan

[21] Appl. No.: 107,762

[22] Filed: Dec. 28, 1979

[30] Foreign Application Priority Data

Jan. 11, 1979 [JP] Japan .................................. 54-2422

[51] Int. Cl.$^3$ ............................................. C08F 2/20
[52] U.S. Cl. ..................................... 526/88; 526/336
[58] Field of Search ........................................ 526/88

[56] References Cited

U.S. PATENT DOCUMENTS 3,682,877 8/1972 Czekay et al. ....................... 526/88
4,071,670 1/1978 Vanzo et al. .......................... 526/88

FOREIGN PATENT DOCUMENTS 1393678 5/1975 United Kingdom .

OTHER PUBLICATIONS

Abstract, Japanese Patent Application Kokai, No. 145.

*Primary Examiner*—Stanford M. Levin
*Attorney, Agent, or Firm*—Craig and Antonelli

[57] ABSTRACT

Granular polymers having a relatively uniform fine particle size as small as about 10 $\mu$m can be produced in high yield by suspension polymerization by conducting the polymerization of one or more crosslinkable polymerizable monomers, non-crosslinkable polymerizable monomers or a mixture thereof in the presence of a suspension agent, and if necessary, together with a suspension assistant and/or a non-reactive organic solvent, under stirring accompanying high speed shearing until the percentage conversion becomes 1 to 50% and continuing the polymerization under stirring without the accompanying high speed shearing and mechanical cutting.

9 Claims, No Drawings

PROCESS FOR PRODUCING GRANULAR POLYMER HAVING UNIFORM FINE PARTICLE SIZE

This invention relates to a process for producing a granular polymer having a uniform fine particle size, e.g. about 10 μm, by conducting aqueous suspension polymerization first under stirring accompanying high speed shearing and continuing the polymerization under stirring without accompanying mechanical cutting or grinding.

In aqueous suspension polymerization of polymerizable monomers, a technique for obtaining granular resin compositions having a uniform particle size became very important recently. This tendency is very remarkable in the field of resins having a particle size of 100 μm or less. Examples of such resins are resins for various toners, stationary phase carriers and separating media for various chromatographies, and the like. Particularly in fillers for gel permeation chromatography (GPC) which has been advanced remarkably recently, ion exchange resins for analysis of amino acids, and the like, since high separating properties as well as pressure resistance is required, spherical porous polymer beads having a uniform particle size of about 10 μm and the like are used; this need strongly demands techniques for producing granular polymers having highly uniform particle size distribution.

In order to produce such granular polymers, there have been made various studies such as changing a ratio of monomer to water (liquid ratio), combination of a suspension agent and a suspension assistant, etc. For example, Japanese Patent Appln Kokai (Laid-Open) No. 145489/77 discloses a process for producing such a polymer by using as a suspension agent a water-insoluble phosphate and a water-soluble alkyl cellulose or hydroxyalkyl cellulose and as a suspension assistant an anionic surface active agent such as ammonium lauryl sulfate or the like. But even if the process is conducted as mentioned above, it is very difficult to produce the desired polymer beads having a particle size of about 10 μm in high yield; and further even if the process is conducted by selecting the most suitable form of agitating blades, number of revolutions of the agitator, liquid ratio, concentration and adding procedure for the suspension agent, it is difficult to increase the yield of the desired polymer beads having a particle size of 5-15 μm. This reason is not clear but this seems to relate to the following phenomena, even if the agitation system is subjected to the most suitable conditions, that is, (i) it is impossible to make oil drop distribution completely uniform at the initial stage of the polymerization, and (ii) it is impossible to inhibit ununiform growth of oil drops completely due to discrepancy of their coalescence speed and dispersion speed.

On the other hand, there is known a suspension polymerization process in which a polymerizable monomer, water and a suspension agent are mixed with stirring accompanying high speed shearing before the polymerization and the resulting mixture is subjected to an ordinary suspension polymerization. But according to this process, it is difficult to produce a polymer having a fine particle size as small as about 10 μm in high yield.

The present inventors have studied to solve such problems from the viewpoint of chemical engineering and surface chemistry as to the behavior of oil drops, particularly the formation of oil drops and accomplished this invention.

According to this invention, porous granular polymers having a particle size of about 10 μm can be produced in high yield by suspension polymerization.

This invention provides a process for producing a granular polymer having a uniform fine particle size by aqueous suspension polymerization which comprises conducting aqueous suspension polymerization of one or more crosslinkable polymerizable monomers, non-crosslinkable polymerizable monomers or a mixture thereof in the presence of a suspension agent, and if necessary, together with a suspension assistant and/or a non-reactive organic solvent under stirring accompanying high speed shearing until the percentage conversion becomes 1 to 50%, and continuing the polymerization under stirring without accompanying high speed shearing and mechanical cutting.

The non-crosslinkable polymerizable monomers include non-crosslinkable styrene series monomers and non-crosslinkable acrylic series monomers. Examples of the styrene series monomers are styrene, and its derivatives such as methylstyrene, monovinylethylbenzene, chlorostyrene, aminostyrene, diphenylethylene, etc. Examples of the acrylic series monomers are alkyl acrylates such as butyl acrylate, and the like, alkyl methacrylates such as butyl methacrylate, and the like, hydroxyalkyl acrylates such as β-hydroxyethyl acrylate, and the like, hydroxyalkyl methacrylates such as β-hydroxyethyl methacrylate, and the like, acrylonitrile, methacrylonitrile, acrylamide, methacrylamide, and the like.

The crosslinkable polymerizable monomers are those having two or more polymerizable unsaturated bonds in the molecule. Examples of the crosslinkable monomers are divinylbenzene, divinyltoluene, divinylnaphthalene, divinylphenol, divinylpyridine, diallyl phthalyate, diallyl fumarate, N,N'-methylenedimethacrylamide, ethylene glycol dimethacrylate, and the like.

As the suspension agent, there can be used hardly-soluble phosphates such as tri-calcium phosphate, hydroxyapatite, magnesium pyrophosphate, and the like, and water soluble high polymers such as alkyl celluloses, polyvinyl alcohol, and the like, alone or as a mixture thereof. From the viewpoint of easiness of the treatment of a suspension produced and easiness of the synthesis of suspension agents, it is preferable to use hardly-soluble phosphates.

The suspension agent is preferably used in an amount of 3 to 200% by weight based on the total weight of monomers used. If the amount is too small, the suspension system becomes unstable, while if the amount is too large, there is a tendency to hinder uniform dispersion.

The use of a suspension assistant is preferable to make the polymerization system more stable. As the suspension assistant, there can be used one or more anionic surface active agents, nonionic surface active agents, amphoteric surface active agents, such as sodium dodecylbenzenesulfonate, sodium laurylsulfonate, sodium alkylnaphthalenesulfonate, dialkylsulfosuccinate salts, polyoxyethylene alkylphenol ether sulfonate salts, etc. From the viewpoint of stability of the dispersion system, the use of anionic surface active agents is preferable. The anionic surface active agent can be used in the range of preferably 0.0005 to 0.01% by weight based on the total weight of monomers. For example, when styrene, monovinylethylbenzene and divinylbenzene are used as monomers and sodium dodecylbenzenesulfonate is used as suspension assistant, sodium dodecylbenzenesulfonate is used in an amount of preferably 0.0005 to 0.003% by weight based on the total weight of the monomers. Sometimes, the use of a so-called salting-out agent such as sodium sulfate, sodium chloride, calcium chloride, or the like together with the suspension assistant is effective.

As the non-reactive organic solvent, there can be used aromatic hydrocarbons such as toluene, ethylbenzene, xylene, diethylbenzene, dodecylbenzene, etc., aliphatic hydrocarbons such as hexane, octane, dodecane, etc., alcohols such as propyl alcohol, butyl alcohol, n-amyl alcohol, isoamyl alcohol, etc., glycols such as ethylene glycol, polyethylene glycol, propylene glycol, dipropylene glycol, etc., nitroalkanes such as nitromethane, nitroethane, etc., alone or as a mixture thereof. The use of the non-reactive organic solvent is particularly preferable in the production of porous granular polymers for use as fillers for GPC and porous ion exchange resin matrixes. Since there is a tendency to enlarge the particle size of the granular polymer when the solvent is used in large excess, it is preferable to use the solvent in an amount of about 150% by weight or less based on the total weight of the monomers used. On the other hand, if the solvent is used too little, it is difficult to produce porous granular polymers. Therefore it is preferable to use the solvent in an amount of about 10% by weight or more based on the total weight of the monomers used. Further, when an alcohol is used as the organic solvent, since the suspension system easily becomes unstable, it is preferable to use a hardly-soluble phosphate together with an alkyl cellulose or polyvinyl alcohol as the suspension agent.

In the process of this invention, at least certain period from the beginning of the polymerization should be subjected to polymerization under stirring accompanying high speed shearing. The term "stirring accompanying high speed shearing" means that shear force causing a rate of shear (or velocity gradient) of $10^5$ min$^{-1}$ to $5 \times 10^6$ min$^{-1}$ acts in a portion of the polymerization system. When the rate of shear is less than $10^5$ min$^{-1}$, the particle size of the resulting granular polymer becomes larger, while when the rate of shear is more than $5 \times 10^6$ min$^{-1}$, the system becomes unstable and polymers having larger particle sizes and those having ultrafine particle sizes are increased. A preferable rate of shear is $3 \times 10^5$ to $2 \times 10^6$ min$^{-1}$.

The term "rate of shear" can be defined as a value obtained by dividing an absolute value of a difference of speeds of two planes by a distance between said two planes, when a polymerization system is present between said two planes or cylindrical planes with a sufficient small distance (e.g. 5 or 6 mm or less).

Examples of apparatus producing such high speed shearing are those having agitating means such as those having a turbine pump therein, e.g. a table-type M-type homomixer manufactured by Tokushu Kika Kogyo Co., Ltd., Japan. Examples other than the homomixer are a pipe-line homomixer (Tokushu Kika Kogyo Co., Ltd.), a homogenizer mixer (Steco Inc., U.S.A.), a turbine mixer (Tsukishima Kikai Co., Ltd., Japan), and the like. Stationary-tube mixers can also be used as long as they can produce a rate of shear of $10^5$ to $5 \times 10^6$ min$^{-1}$. Examples of them are a static mixer (Kenics Co., U.S.A.), a high mixer (Toray Ind., Inc., Japan), I.S.G. motionless mixer (Chas. Ross & Son Co., Inc., U.S.A.), and the like.

If the agitation without accompanying high speed shearing is conducted at the initial period of the polymerization (i.e. if the polymerization is carried out with a usual stirring heretofore employed), a rate of shear is small and the particle size of oil drops is broadened from 5 or 6 μm to 5 or 6 mm (mainly from 50 or 60 μm to 500 or 600 μm) and distributed mainly in larger particle sizes.

The polymerization under stirring accompanying high speed shearing is carried out from the beginning of the polymerization to a time when the percentage conversion becomes 1% or more and 50% or less and more particularly 5% to 30%. If the polymerization under stirring accompanying high speed shearing is stopped before the percentage conversion of 1%, oil drops having a small particle size thus produced are combined to form those having a larger particle size.

The percentage conversion can be identified by gas chromatography.

When the polymerization is carried out under stirring accompanying high speed shearing, the particle size of oil drops at the initial period of the polymerization are made small by high speed shearing and such a small particle size can be maintained so long as the stirring accompanying high speed shearing is continued. With the progress of the polymerization, that is, when the percentage conversion becomes more than 1% and 50% or less, the oil drops having a small particle size increase their viscosity and can be retained comparatively stably in the suspension system hardly influenced by coalescence and division of the particles, even if the polymerization system is transferred to the stirring system without accompanying high speed shearing. After such a stage, if the polymerization is continued under stirring by using an agitation apparatus having a turbine pump therein such as a homomixer, the particles having a small particle size, which can be present comparatively stably under stirring without accompanying high speed shearing, are cut or ground mechanically by the revolving blades which revolve with high speed and give high speed shearing to make the particle size finer. Therefore, after the small particles (oil drops) increase their viscosity and can be present comparatively stably, cutting or grinding should not be given to the small particles. Further, generally speaking, since the small particles which can be present relatively stably and increase their viscosity are possibly divided if the polymerization is carried out under stirring accompanying high speed shearing even after such a stage, and since the small particles can be present relatively stably under stirring without accompanying high speed shearing, it is preferable to continue the polymerization under stirring without accompanying high speed shearing after the percentage conversion becomes in the range of 1% to 50%. Thus the polymerization under stirring accompanying high speed shearing is stopped before the percentage conversion becomes not more than 50% and the polymerization is continued under ordinary stirring without accompanying high speed shearing.

In the process of this invention, the polymerization system is treated so as to finally produce a granular polymer having a particle size of about 10 μm in good yield by employing the polymerization under stirring accompanying high speed shearing. Therefore, to add one or more monomers or polymers or copolymers to the polymerization system at or after the stage of employing ordinally stirring without accompanying high speed shearing is not preferable, since the particle size of final granular polymer is changed greatly or such an addition is meaningless. On the other hand, it is preferable to add optionally one or more suspension agents and suspension assistants at such a stage in order to inhibit the combination of the particles surely, while observing particle size distribution, if necessary.

The polymerization of this invention is usually carried out at a temperature of about 65° to 90° C. As the polymerization catalyst, there can be used radical polymerization initiators such as peroxides, e.g. benzoyl peroxide, para-tertiary-butyl perbenzoate, etc., azo compounds, e.g. azobisisobutyronitrile, etc., in an amount of about 0.5 to 3% by weight based on the total weight of the monomers used.

It is preferable to use the aqueous medium in an amount of 5 times or more based on the total weight of the monomers used. If the amount is less than 5 times, coalescence or coagulation of the oil drops at the initial period of the polymerization easily takes place and it becomes very difficult to produce the granular polymer having a uniform small particle size. On the other hand, if the amount of the aqueous medium is too large, efficiency of the production is lowered, so that it is preferable to use the aqueous medium in an amount of 15 times or less of the total weight of the monomers used.

This invention is illustrated by way of the following Examples, in which all percents are by weight unless otherwise specified.

EXAMPLE 1

In a 1-liter four-necked separable flask equipped with a thermometer, a bimetal type relay, a reflux condenser and a homomixer (a table-type M-type manufactured by Tokushu Kika Kogyo Co., Ltd.), 67.2 g of styrene, 17.2 g of 60% divinylbenzene (a mixture of 60% of divinylbenzene and 35% of monovinylethylbenzene, hereinafter the above-mentioned expression being used in the same manner), 0.52 g of benzoyl peroxide (BPO), 23.4 g of a suspension of 10% hardly-soluble tri-calcium phosphate (TCP), 1.26 g of 1% sodium dodecylbenzenesulfonate (DA) and 420 ml of demineralized water were placed and stirred with accompanying high speed shearing (rate of shear about $1.3 \times 10^6$ min$^{-1}$). The contents were heated to 70° to 75° C. by using a mantle heater while dispersing. The polymerization was carried out for 2 hours at that temperature (percentage conversion 30%). Subsequently, the reaction solution was quickly removed to another 1-liter four-necked separable flask equipped with a thermometer, a bimetal type relay, a reflux condenser and a stirrer having H-type blade and the polymerization was continued at 80°–85° C. for 4 hours with a stirring rate of 500–600 rpm. During the polymerization, samples were often taken from the reaction solution to observe particle size of the beads by an optical microscope and 150 g of TCP was intermittently added to the reaction solution in order to make the dispersion system stable and to maintain the small particle size. The spherical beads thus produced were filtered, washed with a dilute hydrochloric acid solution and dried. Microphotographs of the beads were taken and particle size distribution (proportion) of the beads was measured and converted to percents by weight as follows:

| Particle size (μm) | Proportion (%) |
|---|---|
| 1–5 | 22 |
| 5–15 | 54 |
| 15–25 | 21 |
| 25–35 | 3 |
| >35 | 0 |
| Total | 100 |

COMPARATIVE EXAMPLE 1

The process of Example 1 was repeated except that a stirrer having H-type blade was used during the polymerization and a homomixer was not used. Particle size distribution of the product was as follows.

| Particle size (μm) | Proportion (%) |
|---|---|
| 1–5 | 0 |
| 5–15 | 2.5 |
| 15–25 | 4.5 |
| 25–35 | 8 |
| 35–45 | 10 |
| 45–55 | 14 |
| 55–65 | 21 |
| 65–75 | 14 |
| 75–85 | 11 |
| 85–95 | 9 |
| >95 | 6 |
| Total | 100 |

COMPARATIVE EXAMPLE 2

The process of Example 1 was repeated except that a homomixer was used in the whole procedure and a stirrer having H-type blade was not used. After 3–4 hours from the temperature rise (the percentage conversion about 60%), there appeared breakdown of spherical beads by the homomixer, which gave rise to clogging of the apparatus to make the continuation of the reaction difficult.

The clogging of the apparatus can be explained that when the hardness of beads is increased with the progress of the polymerization, the beads are broken by shear force and sharp blades of the homomixer to form broken small fragments, which bring about clogging of the apparatus. Therefore, the polymerization by using only a homomixer is not suitable, and stirring conditions of the polymerization system should be changed to ones without accompanying shear force and mechanical cutting or grinding at a proper time after the percentage coversion of the beads reached 1–50%.

EXAMPLE 2

Using the same flask and apparatus as used in Example 1, 72 g of styrene, 40 g of 60% divinylbenzene, 1.2 g of BPO, 60 g of a suspension of 10% TCP, 2.4 g of a 1% DA aqueous solution, 40 g of toluene, 20 g of diethylbenzene and 560 ml of demineralized water were placed in the flask and the polymerization was carried out at 70°–75° C. for about 1.5 hours under stirring accompanying high speed shearing (rate of shear about $1.3 \times 10^6$ min$^{-1}$) by using a homomixer (percentage conversion 25%). Subsequently, the reaction solution was quickly removed to another flask equipped with a stirrer having H-type blade as used in Example 1 and the polymerization was continued at 80°–85° C. for 5 hours with a stirring rate of 400–450 rpm. During the polymerization, TCP and DA were added intermittently to maintain the small particle size of the beads. The product was filtered, washed with a dilute hydrochloric acid solution, and dried. Particle size distribution of the resulting beads was measured by using microphotographs with the results as follows.

| Particle size (μm) | Proportion (%) |
|---|---|
| 1-5 | 18 |
| 5-15 | 43 |
| 15-25 | 26 |
| 25-35 | 10 |
| >35 | 3 |
| Total | 100 |

COMPARATIVE EXAMPLE 3

The process of Example 2 was repeated except that a stirrer having H-type blade was used in the whole procedure and a homomixer was not used. Particle size distribution of the product was as follows.

| Particle size (μm) | Proportion (%) |
|---|---|
| 1-5 | 0 |
| 5-25 | 9 |
| 25-45 | 16 |
| 45-65 | 31 |
| 65-85 | 25 |
| 85-105 | 13 |
| >105 | 6 |
| Total | 100 |

EXAMPLE 3

Using the same flask and apparatus as used in Example 1, 96 g of styrene, 24 g of 60% divinylbenzene, 0.75 g of BPO, 6.9 g of ammonium salt of copolymer of styrene and maleic acid, 8.9 g of sodium chloride, and 550 ml of demineralized water were placed in the flask and the polymerization was carried out at 70°–75° C. for 1.5 hours under stirring accompanying high speed shearing (rate of shear about $2 \times 10^6$ min$^{-1}$) by using a homomixer (percentage conversion 20%). Subsequently, the reaction solution was quickly removed to another flask equipped with a stirrer having H-type blade as used in Example 1 and the polymerization was continued at 80°–85° C. for 5–6 hours with a stirring rate of 500–600 rpm. The product was filtered, and dried. Particle size distribution of the product was as follows.

| Particle size (μm) | Proportion (%) |
|---|---|
| 1-5 | 5 |
| 5-15 | 21 |
| 15-25 | 30 |
| 25-35 | 22 |
| 35-45 | 14 |
| >45 | 8 |
| Total | 100 |

COMPARATIVE EXAMPLE 4

The process of Example 3 was repeated except that a stirrer having H-type blade was used in the whole procedure and a homomixer was not used. The produced beads had a particle size of 100–1000 μm. This clearly shows that according to this process the resulting particles become larger and those having a small particle size are not produced.

EXAMPLE 4

In a 1-liter four-necked separable flask equipped with a homomixer as used in Example 1, 100 g of 60% divinylbenzene, 5 g of BPO, 100 g of an aqueous suspension of 10% TCP, 800 ml of aqueous 0.5% methyl cellulose solution, 36 g of toluene, 36 g of diethylbenzene and 150 g of isoamyl alcohol were placed and the polymerization was carried out at 70°–75° C. for 3 hours under stirring accompanying high speed shearing (rate of shear about $7 \times 10^5$ min$^{-1}$) by using a homomixer (percentage conversion 20%). Subsequently, the reaction solution was quickly removed to the same 1-liter four-necked separable flask equipped with a stirrer having H-type blade as used in Example 1 and the polymerization was continued at 80°–85° C. for 5 hours with a stirring rate of 500–600 rpm. Particle size distribution of the product was as follows.

| Particle size (μm) | Proportion (%) |
|---|---|
| 1-5 | 9 |
| 5-15 | 38 |
| 15-25 | 30 |
| 25-35 | 18 |
| >35 | 5 |
| Total | 100 |

COMPARATIVE EXAMPLE 5

In the same 1-liter separable flask equipped with a homomixer as used in Example 1, the same ingredients as used in Example 1 were placed and stirred with high speed shearing (rate of shear about $1.3 \times 10^6$ min$^{-1}$) at normal temperatures for 20 to 30 minutes for preliminary dispersion. Subsequently, the resulting dispersion was removed to the same 1-liter four-necked separable flask equipped with a stirrer having H-type blade as used in Example 1 and the polymerization was carried out at 70°–75° C. for 2 hours and 80°–85° C. for 4 hours with a stirring rate of 500–600 rpm. During the polymerization, the particle size of beads was often observed by using an optical microscope and 200 g of TCP was added intermittently. The produced beads were treated in the same manner as in Example 1. Particle size distribution of the beads was as follows.

| Particle size (μm) | Proportion (%) |
|---|---|
| 1-5 | 2.2 |
| 5-15 | 8 |
| 15-25 | 10 |
| 25-35 | 12 |
| 35-45 | 23 |
| 45-55 | 19 |
| 55-65 | 11 |
| 65-75 | 7 |
| 75-85 | 4 |
| 85-95 | 2 |
| >95 | 1.8 |
| Total | 100 |

In the above-mentioned Examples, the percentage conversions were measured by taking 1 ml of a sample from the reaction solutions (suspensions), adding 1 ml of a mixed solution of methyl ethyl ketone, methanol and n-propanol in equi-weight ratio thereto to give a uniform solution, which was analyzed by gas chromatography to measure proportions of the monomers.

As is clear from the above Examples, granular polymers having a relatively uniform and fine particle size as small as about 10 μm can be produced in high yield according to the process of this invention.

What is claimed is:

1. A process for producing a granular polymer having a fine particle size by aqueous suspension polymerization which comprises conducting aqueous suspension polymerization of one or more crosslinkable polymerizable monomers, non-crosslinkable polymerizable monomers or a mixture thereof in the presence of a suspension agent under stirring accompanying high speed shearing at a rate of shear in the range of $10^5$ to $5 \times 10^6$ min$^{-1}$ until the percentage conversion becomes 1 to 50% and continuing the polymerization under stirring without the accompanying high speed shearing and without mechanical cutting; said non-crosslinkable polymerizable monomer being a styrene series monomer or an acrylic series monomer.

2. A process according to claim 1, which further comprises using a suspension assistant and/or a non-reactive organic solvent together with the suspension agent.

3. A process according to claim 1 or 2, wherein the monomers used are a mixture of divinylbenzene as the crosslinkable polymerizable monomer and a styrene series monomer as the non-crosslinkable polymerizable monomer.

4. A process according to claim 1 or 2, wherein a mixture of divinylbenzene, styrene and monovinylethylbenzene is used as the monomers.

5. A process according to claim 2, wherein an alcohol or a mixture of an alcohol and other organic solvent is used as the non-reactive organic solvent and a hardly soluble phosphate and an alkyl cellulose are used as the suspension agent.

6. A process according to claim 1 or 2, wherein the polymerization under stirring accompanying high speed shearing is conducted until the percentage conversion becomes 5 to 30%.

7. A process according to claim 2, wherein divinylbenzene is used as the crosslinkable polymerizable monomer, a styrene series monomer is used as the non-crosslinkable polymerizable monomer, a hardly-soluble phosphate or a mixture of said phosphate and an alkyl cellulose is used as the suspension agent, at least one compound selected from aromatic hydrocarbons, aliphatic hydrocarbons and alcohols is used as the non-reactive organic solvent.

8. A process according to claim 7, wherein the suspension agent is a mixture of a hardly-soluble phosphate and methyl cellulose, the non-reactive organic solvent is an alcohol or a mixture of an alcohol and one or more aromatic hydrocarbons or aliphatic hydrocarbons, and the polymerization under stirring accompanying high speed shearing of a rate of shear of $3 \times 10^5$ to $2 \times 10^6$ min$^{-1}$ is conducted until the percentage conversion becomes 5 to 30%.

9. A process according to claim 1, wherein the polymerization under stirring without the high speed shearing is conducted at a rate of shear less than $10^5$ min$^{-1}$.

* * * * *